(12) United States Patent
Grube et al.

(10) Patent No.: US 9,122,596 B2
(45) Date of Patent: Sep. 1, 2015

(54) UPDATING A SET OF MEMORY DEVICES IN A DISPERSED STORAGE NETWORK

(71) Applicant: CLEVERSAFE, INC., Chicago, IL (US)

(72) Inventors: Gary W. Grube, Barrington Hills, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 14/257,398

(22) Filed: Apr. 21, 2014

(65) Prior Publication Data

US 2014/0229775 A1 Aug. 14, 2014

Related U.S. Application Data

(63) Continuation of application No. 13/252,410, filed on Oct. 4, 2011, now Pat. No. 8,707,105.

(60) Provisional application No. 61/408,971, filed on Nov. 1, 2010.

(51) Int. Cl.
G06F 11/00 (2006.01)
G06F 11/07 (2006.01)
G06F 17/30 (2006.01)

(52) U.S. Cl.
CPC ...... *G06F 11/0727* (2013.01); *G06F 17/30893* (2013.01)

(58) Field of Classification Search
USPC ..................................... 714/42, 25
See application file for complete search history.

(56) References Cited

U.S. PATENT DOCUMENTS

| 7,636,724 | B2 | 12/2009 | de la Torre et al. | |
|---|---|---|---|---|
| 7,673,190 | B1 * | 3/2010 | Engelbrecht et al. | 714/49 |
| 8,095,763 | B2 * | 1/2012 | Piszczek et al. | 711/167 |
| 8,560,879 | B1 * | 10/2013 | Goel | 714/6.1 |

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

*Primary Examiner* — Sarai Butler
(74) *Attorney, Agent, or Firm* — Garlick & Markison; Timothy W. Markison

(57) ABSTRACT

A method begins by tracking age related failure levels of memory devices within the storage unit. The method continues by maintaining a data location table that maps a range of DSN addresses allocated to the storage unit to the memory devices and further records storing of encoded data slices having specific DSN addresses within the memory devices. The method continues, when the age related failure level for a memory device compares unfavorably to a first failure level threshold, by determining to reassign a portion of DSN addresses assigned to the memory device. The method continues by identifying a second memory device having a corresponding age related soft failure level comparing favorable to the first failure level threshold. The method continues by reassigning the portion of the DSN addresses from the memory device to the second memory device and updating the data location table.

20 Claims, 15 Drawing Sheets computing system 10

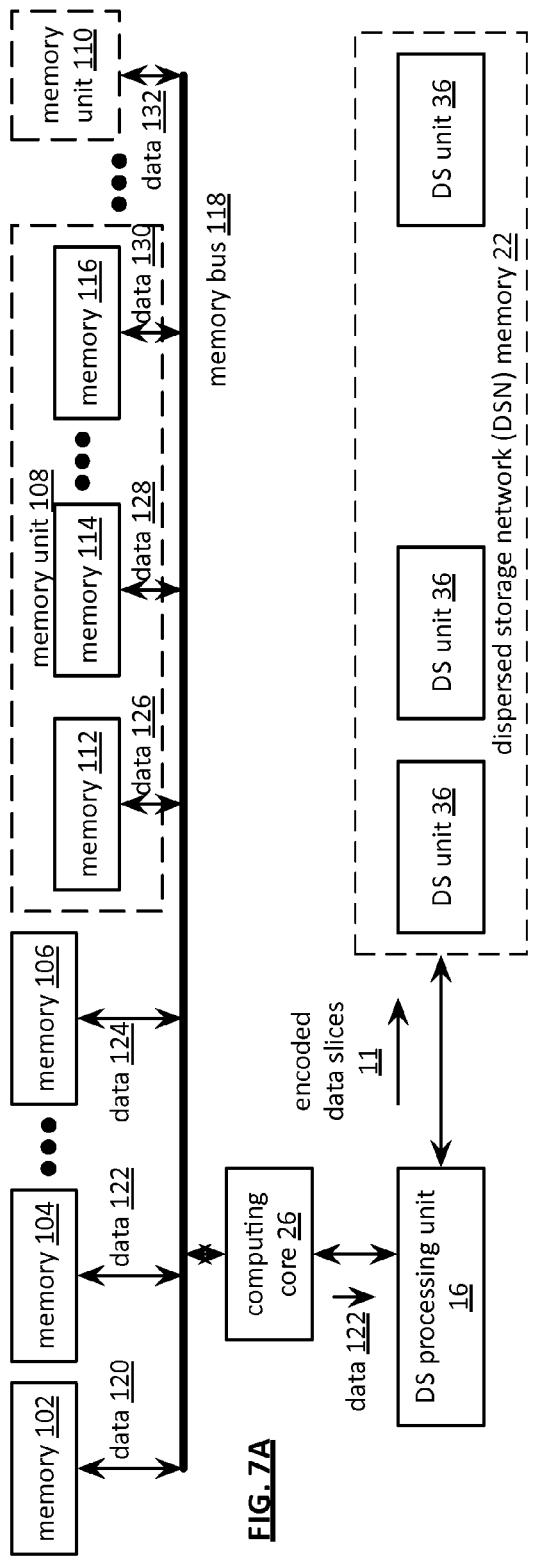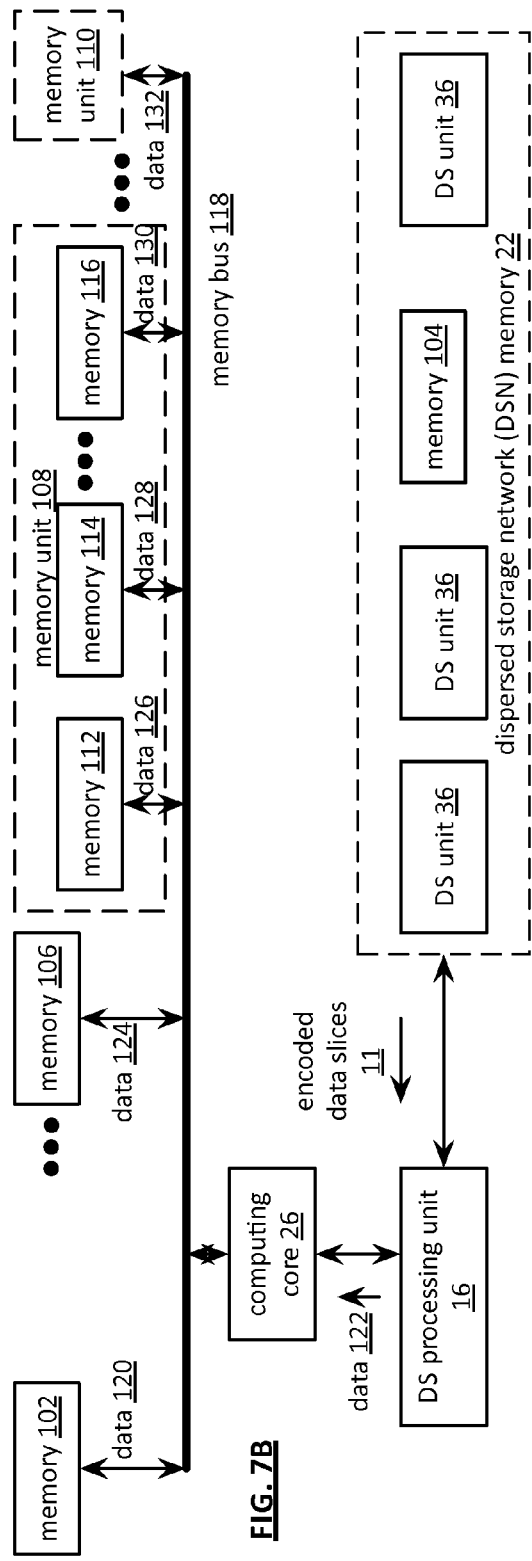

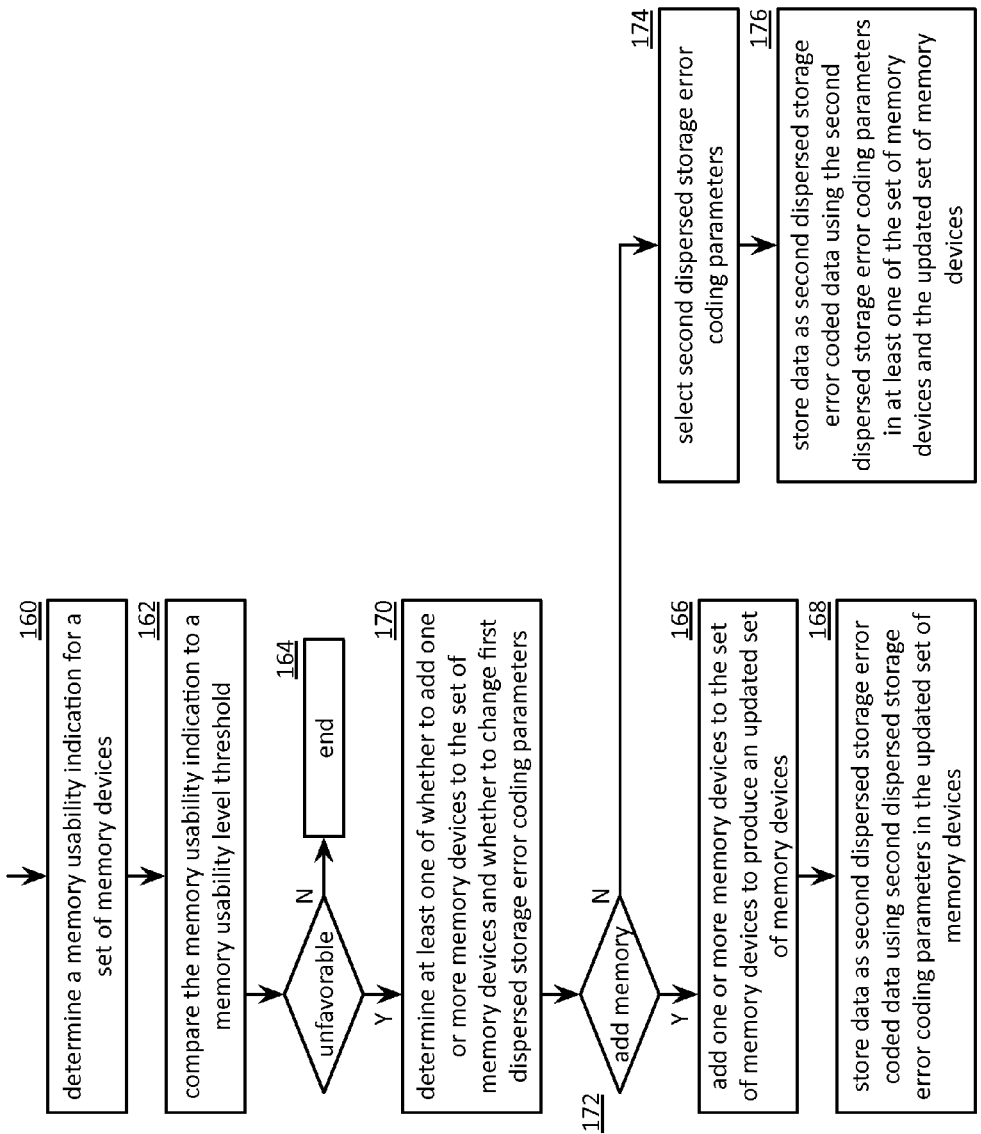

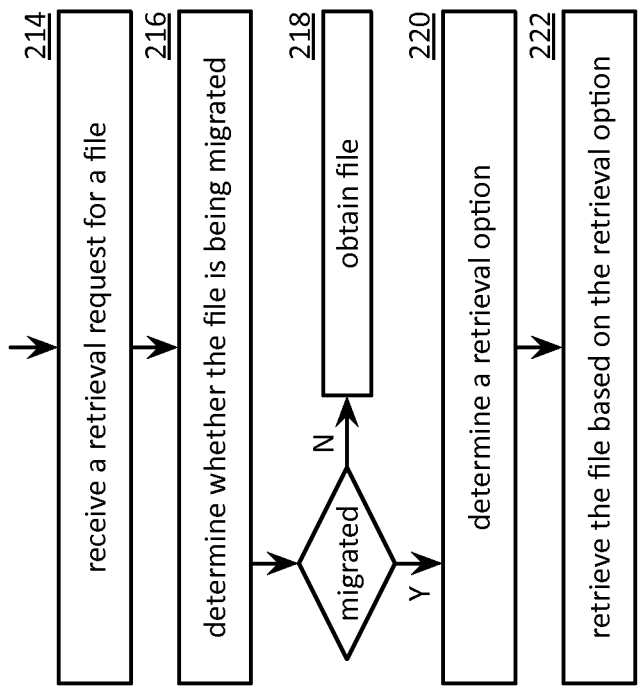

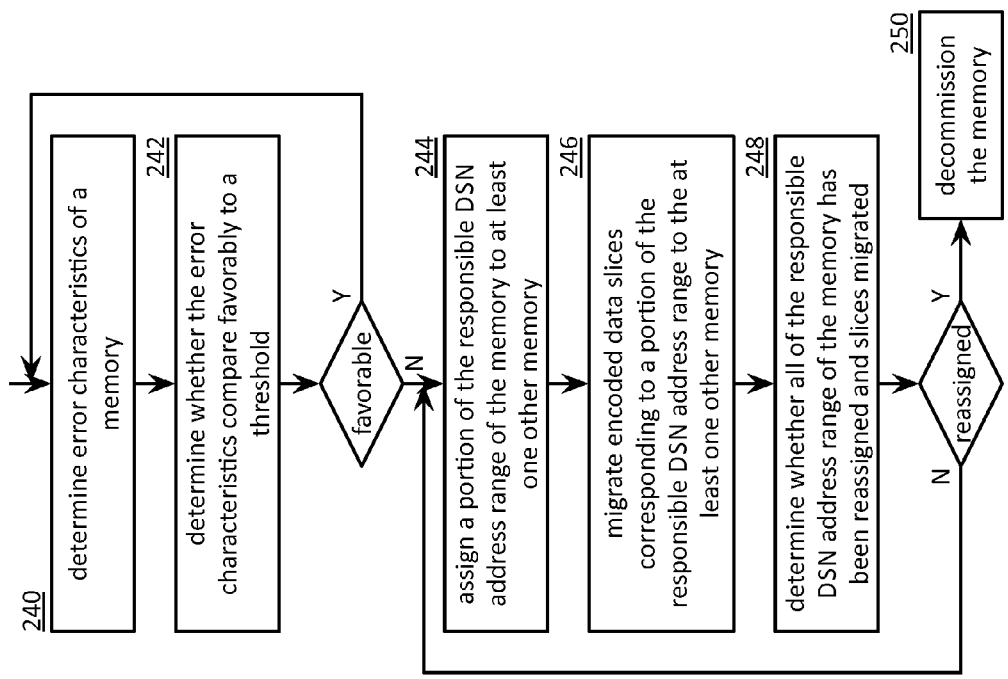

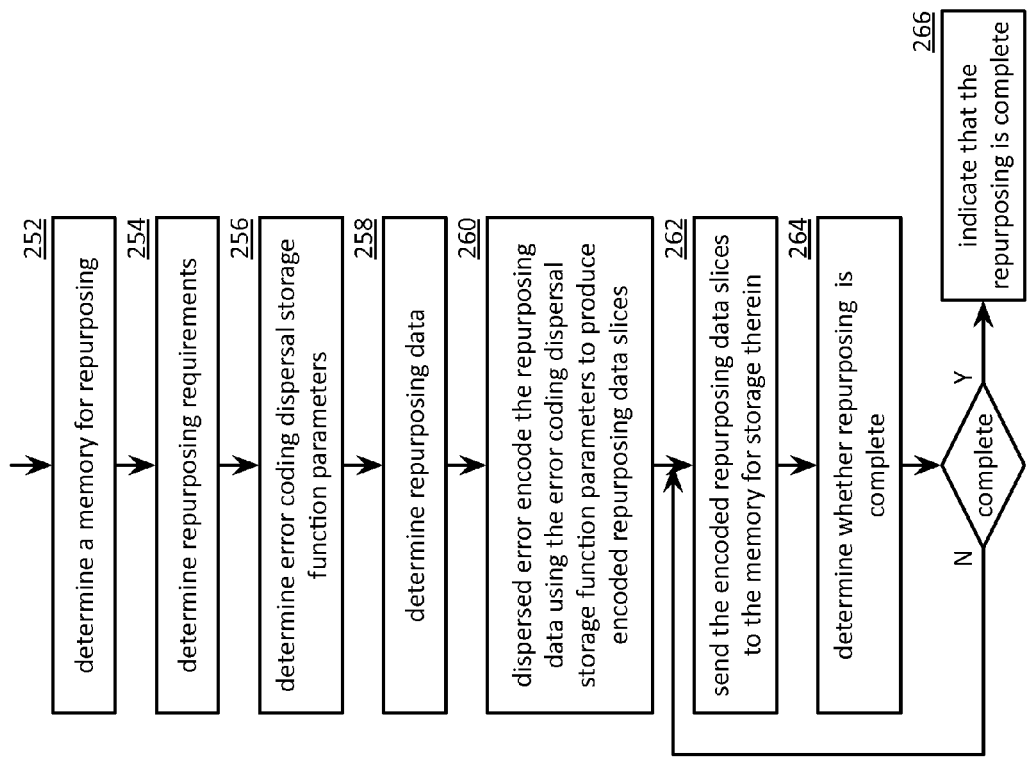

UPDATING A SET OF MEMORY DEVICES IN A DISPERSED STORAGE NETWORK

CROSS REFERENCE TO RELATED PATENTS

The present U.S. Utility Patent Application claims priority pursuant to 35 U.S.C. §120 as a continuation of U.S. Utility application Ser. No. 13/252,410, entitled "UPDATING A SET OF MEMORY DEVICES IN A DISPERSED STORAGE NETWORK", filed Oct. 4, 2011, issuing as U.S. Pat. No. 8,707,105 on Apr. 22, 2014, which claims priority pursuant to 35 U.S.C. §119(e) to U.S. Provisional Application No. 61/408,971, entitled "MEMORY UTILIZATION IN A DISPERSED STORAGE NETWORK", filed Nov. 1, 2010, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 7A is a schematic block diagram of an embodiment of a hybrid computing system in accordance with the invention;

FIG. 7B is a schematic block diagram of another embodiment of a hybrid computing system in accordance with the invention;

FIG. 9B is a flowchart illustrating another example of allocating memory in accordance with the invention;

FIG. 12A is a table illustrating an example of a data location table in accordance with the invention;

FIG. 12B is a flowchart illustrating an example of retrieving data in accordance with the invention;

FIG. 14 is a flowchart illustrating another example of migrating data in accordance with the invention; and FIG. 15 is a flowchart illustrating an example of repurposing a memory in accordance with the invention.

DETAILED DESCRIPTION OF THE INVENTION

Figure 1:
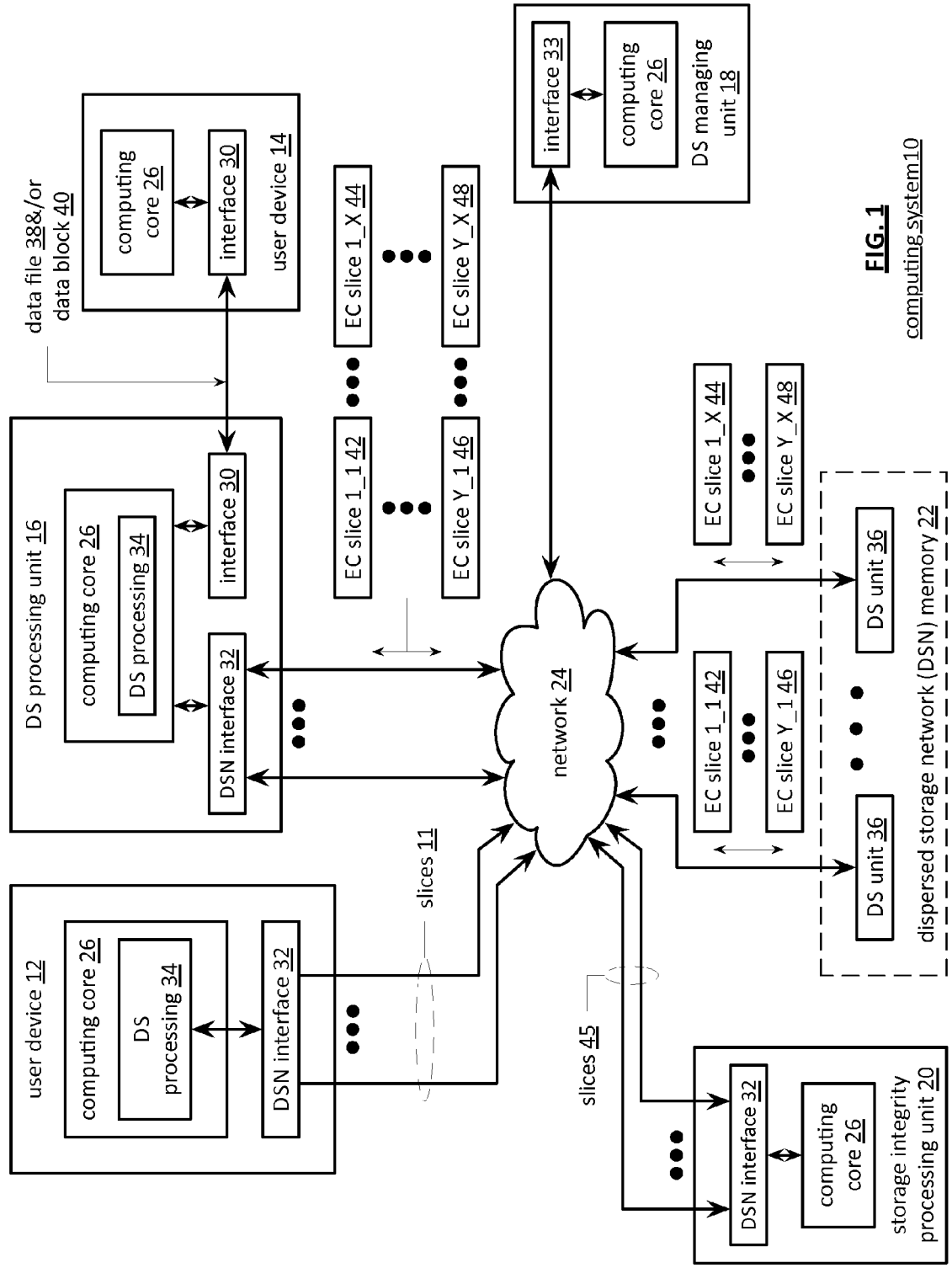
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-15.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-15.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
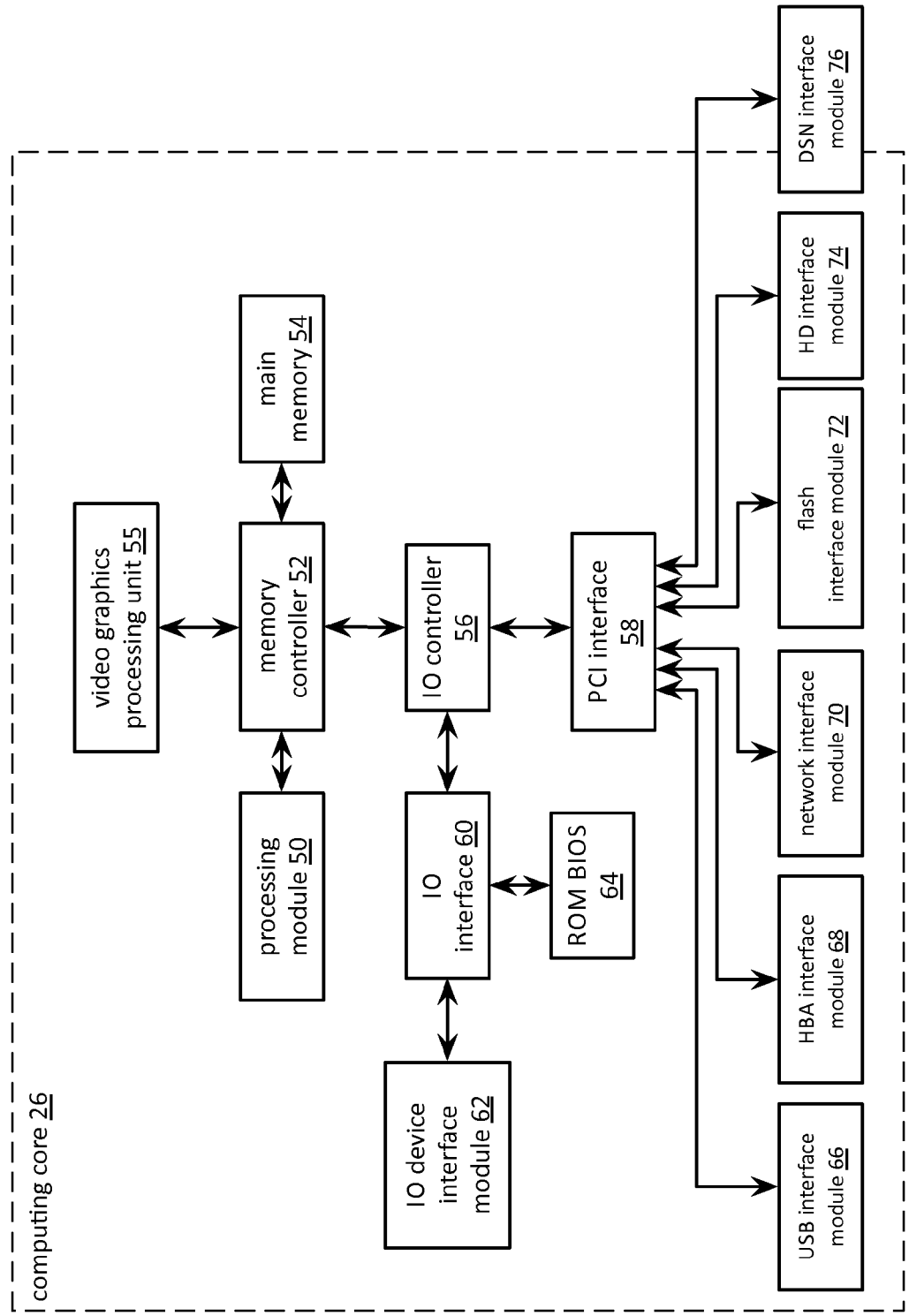
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-15.

Figure 3:
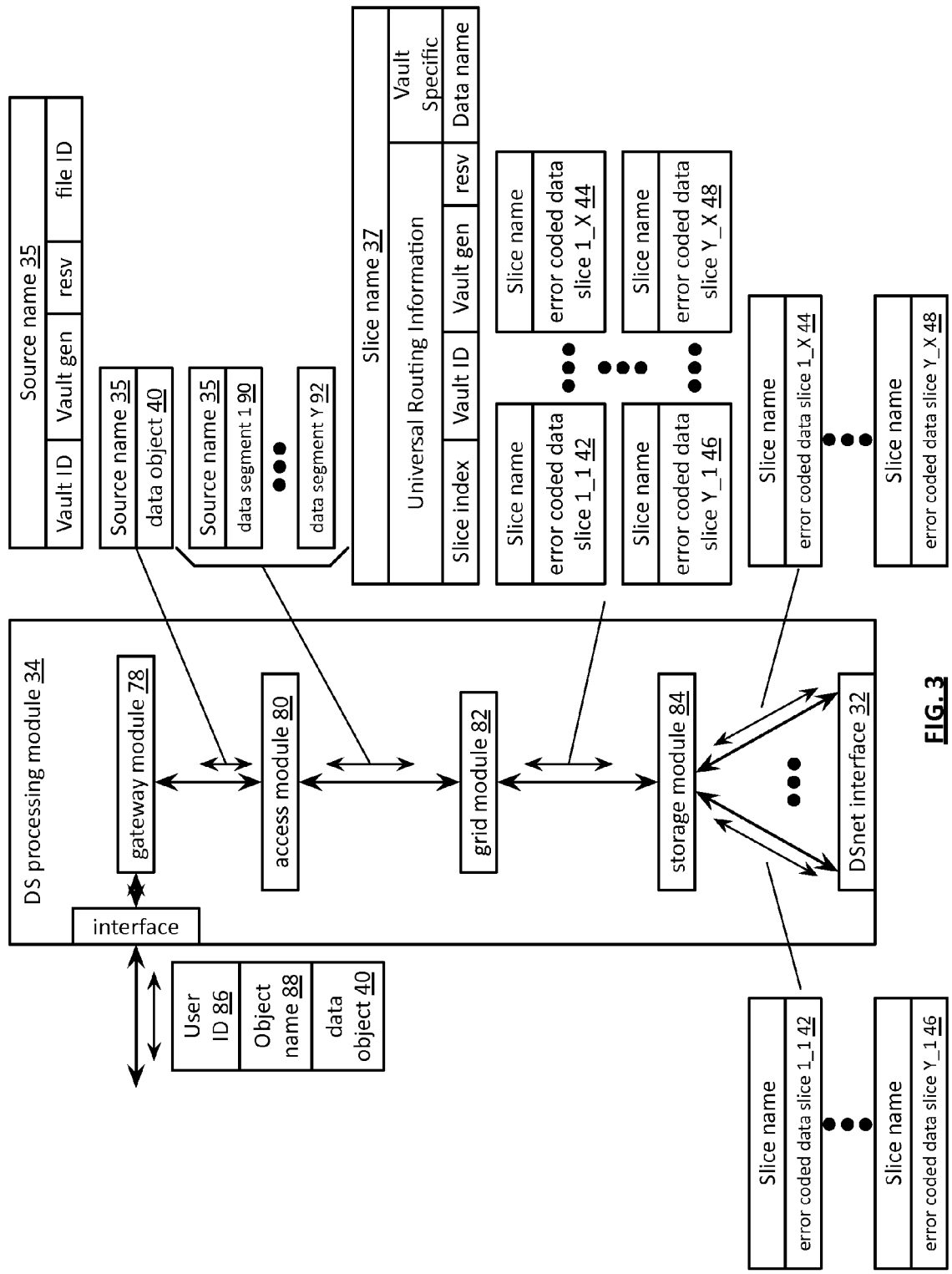
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X–T (e.g., 16–10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
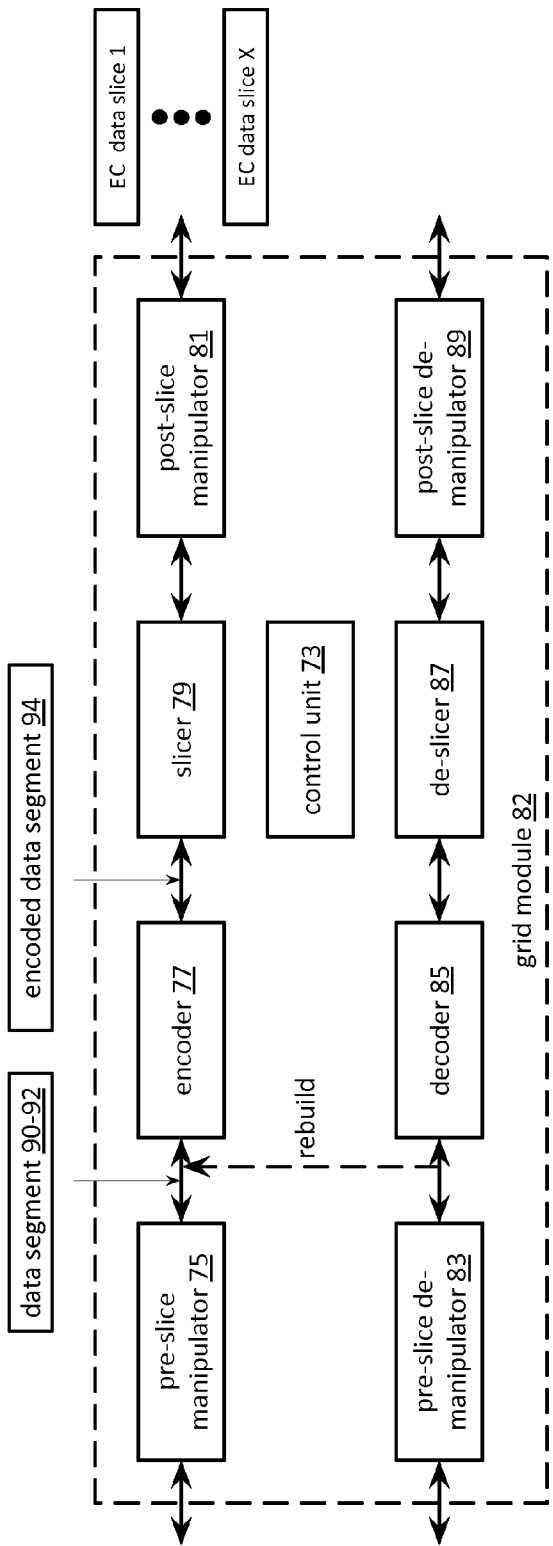
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
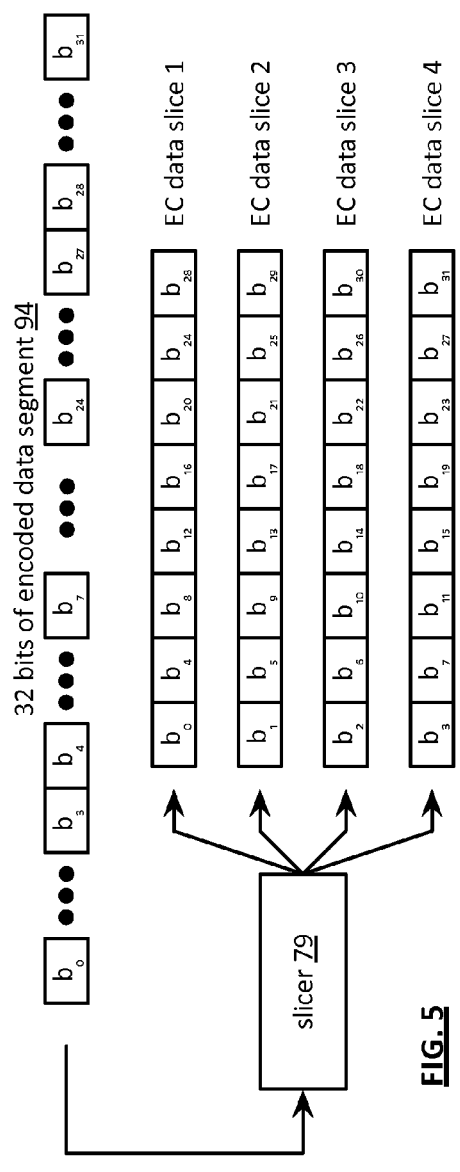
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
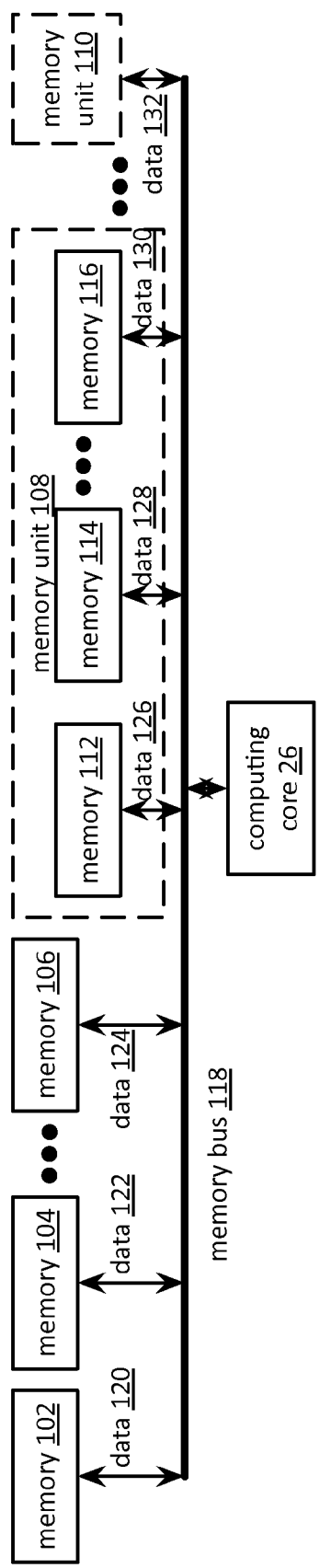
FIG. 6A is a schematic block diagram of an embodiment of a legacy computing system in accordance with the invention.

FIG. 6A is a schematic block diagram of an embodiment of a legacy computing system. The system includes a plurality of memories 102-106, a plurality of memory units 108-110, a memory bus 118, and a computing core 26. The memory units 108-110 may include a plurality of memories 112-116. The memories 102-106 and 112-116 may include one or more of a magnetic hard drives, a solid state memory, a tape drive, and optical memory, or any other type of memory technology to store and retrieve data. The memories 102-106 and 112-116 may have varying capacities. For example, memory 102 has a 500 gigabyte (GB) capacity, memory 104 as a 1 terabyte (TB) capacity, and memory 106 as a 2 TB capacity. The memories 102-106 and 110-116 may be implemented with different models of different manufacturers.

The memories 102-106 and 112-116 are operably coupled to the computing core 26 via the memory bus 118 to facilitate transfer of data 120-124 and data 126-132. For example, memory 104 communicates data 122 with the computing core 26. The computing core 26 may store replicated copies of the same data in two or more of the memories. For example, computing core 26 stores a first copy of data in memory 106 and a second copy of the data in memory 114. As another example, computing core 26 stores the first copy of data in memory 112 and a second copy of the data in memory 116 when the data is to be replicated within a single memory unit 108.

A typical memory of the memories 102-106 and 112-116 may fail from time to time as the memory ages beyond a usable memory life time period. Memory costs of the computing system include memory replacement costs and memory cost over the usable memory life. The memory cost over the usable memory life includes the memory cost divided by the usable memory life time period. Lowering the memory cost lowers the memory costs of the computing system. Extending the usable memory life time period lowers the memory costs of the computing system. Replacing the memory impacts cost of the legacy computing system based on a memory replacement cost and a memory disposal cost.

Figure 6B:
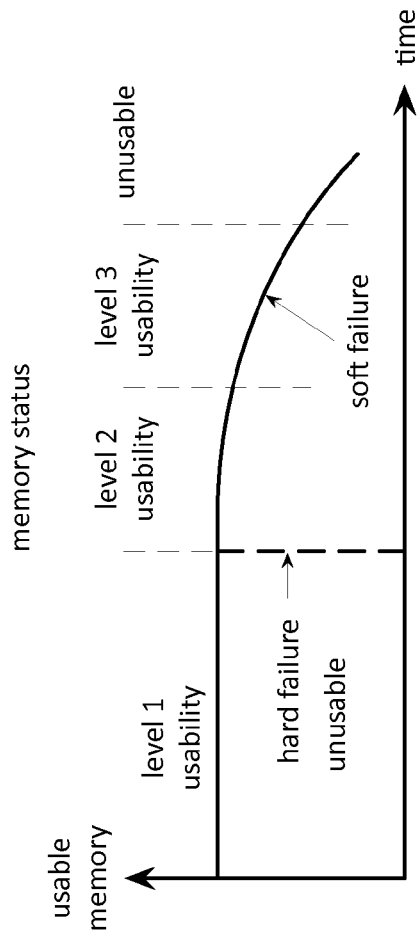
FIG. 6B is a graph illustrating an example of a memory status in accordance with the invention.

FIG. 6B is a graph illustrating an example of a memory status. The graph depicts usable memory (e.g., capacity) over time for a memory device (e.g., a magnetic hard disk drive). Usability is stratified into four categories including a level 1 usability, a level 2 usability, a level 3 usability, and an unusable level. Note that a maximum amount of usable memory is available during the level 1 time period. A degradation of usable memory occurs over time as the memory device ages. For example, a hard failure abruptly changes the usable memory level from a usable level (e.g., level 1) to the unusable level. As another example, soft failures may gradually change the usable level from level 1 to level 2 to level 3 to the unusable level when the usable memory is below a threshold.

The memories 102-106 and 112-116 may be of different ages with respect to initial use such that some memories may fail sooner than other memories. Each memory may follow the memory status curve of the graph in different ways. Analyzing or predicting a memory status of a memory may provide an improvement in memory utilization by avoiding use of a memory that is not favorable for storing data based on an associated storage requirement of the data. A catastrophic loss of data may occur if only one copy of data is stored on a memory that follows the soft failure curve such that eventually the data is no longer retrievable. A catastrophic loss of data may not occur when one pillar of encoded data slices, produced using an error coding dispersal storage function, is stored on a memory that follows the soft failure curve such that eventually the pillars is no longer retrievable. In such a scenario, the data may be still be retrievable when a threshold number of encoded data slices from other memories can be retrieved. A single memory failure may be much less likely to cause a catastrophic loss of data when the memory is utilized in a dispersed storage network. An improvement to the overall usable memory life may be provided by migrating a memory from a legacy memory system to a dispersed storage network. The method of migrating a memory from the legacy memory system to the dispersed storage network is discussed in greater detail with reference to FIGS. 7A-15.

FIGS. 7A-7B illustrates a memory migration scenario illustrating how data contained in a memory of a legacy computing system may be migrated to a dispersed storage network (DSN) and how the memory may be physically repurposed in the dispersed storage to store encoded data slices rather than data (e.g., whole data objects). A reliability and availability improvement of the data may be provided in such a migration scenario since the data is stored as encoded data slices and failure of the memory may not impact data availability. An improvement in the useful life of the memory may be provided in the migration scenario since a failure of a memory in the DSN may not impact data availability to the degree that a failure of the memory when utilized in the legacy computing system. The method of operation of migrating data and memories from a legacy computing system to a DSN is discussed in greater detail with reference to FIGS. 8-15.

FIG. 7A is a schematic block diagram of an embodiment of a hybrid computing system. The hybrid computing system includes a legacy computing system operably coupled to a dispersed storage network (DSN). The system includes a plurality of memories 102-106, a plurality of memory units 108-110, a memory bus 118, a computing core 26, a dispersed storage (DS) processing unit 16, and a DSN memory 22. As illustrated, the DSN memory 22 includes a plurality of DS units 36. Memory unit 108 includes a plurality of memories 112-116. The computing core 26 interoperates with the DS processing unit 16 as described below.

The DS processing unit 16 encodes data utilizing an error coding dispersal storage function to produce encoded data slices 11. The DS processing unit 16 outputs the encoded data slices 11 to the DSN memory 22 for storage. The DS processing unit 16 retrieves encoded data slices 11 from the DSN memory and decodes the encoded data slices 11 utilizing the error coding dispersal storage function to reproduce the data. In an example of operation, the computing core 26 retrieves data 122 from memory 104 when memory device 104 has an expired usable memory life with respect to a legacy storage protocol utilized by the legacy computing system. The computing core 26 sends the data 122 to the DS processing unit 16. The DS processing unit 16 encodes the data 122 utilizing the error coding dispersal storage function to produce encoded data slices of data 122. The DS processing unit 16 sends the encoded data slices 11 to the DSN memory 22 for storage in a plurality of DS units 36. Note that the computing core 26 may retrieve the data 122 either from memory 104 or from the DS processing unit 16. The computing core 26 retrieves the data 122 from the DS processing unit 16 when the memory 104 is removed from the legacy computing system. The method of retrieval of data 122 is discussed in greater detail with reference to FIG. 7B.

FIG. 7B is another schematic block diagram of another embodiment of a hybrid computing system. The hybrid computing system includes a legacy computing system and a dispersed storage network (DSN). The system includes a plurality of memories 102-106, a plurality of memory units 108-110, a memory bus 118, a computing core 26, a dispersed storage (DS) processing unit 16, and a DSN memory 22. The memory 104 is physically moved from the legacy computing system (e.g., disconnected from the memory bus 118 as shown in FIG. 7A) to the DSN when the memory 104 has an expired usable memory life and data 122 has been extracted from the memory 104. The memory 104 is utilized as a DS unit 36 as part of the DSN memory 22 when memory 104 is moved to the DSN. For example, the memory 104 receives encoded data slices for storage from the DS processing unit 16. As another example, the memory 104 outputs encoded data slices to the DS processing unit 16 in response to a retrieval request.

In an example of operation, the computing core 26 sends a retrieval request to the DS processing unit 16 for data 122. The DS processing unit 16 retrieves encoded data slices 11 from the DSN memory 22. The DS processing unit 16 decodes the encoded data slices 11 utilizing an error coding dispersal storage function to reproduce the data 122. The DS processing unit 16 outputs the data 122 to the computing core 26. In an instance, at least some of the encoded data slices 11 (e.g., of data 122) are stored within the memory 104. In another instance, none of the encoded data slices 11 (e.g., of data 122) are stored within the memory 104.

Figures 8A, 8B:
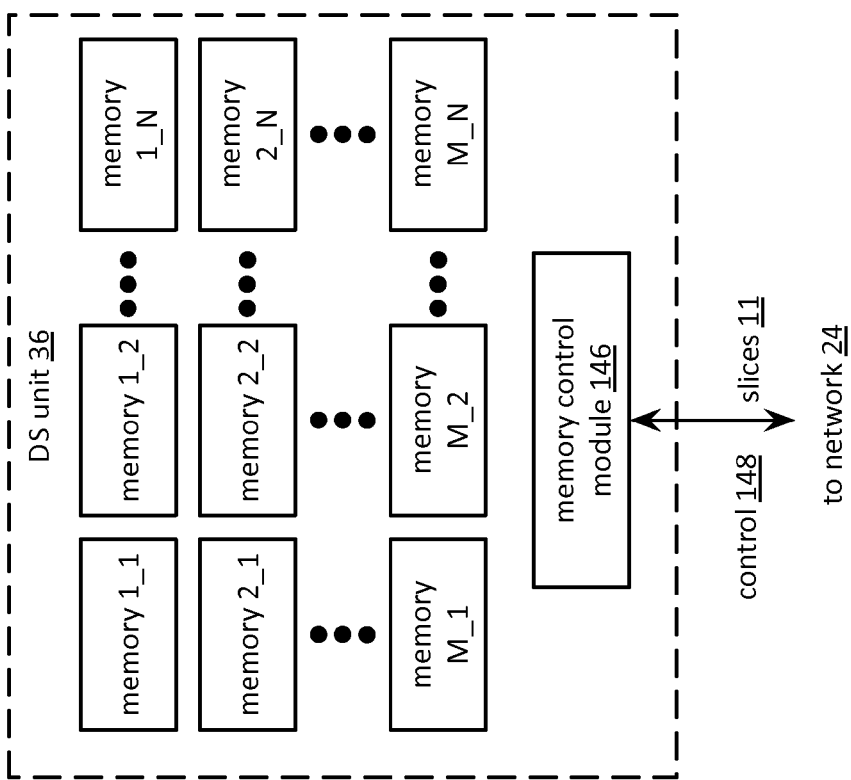
FIG. 8A is a schematic block diagram of an embodiment of a dispersed storage (DS) unit in accordance with the invention.
FIG. 8B is a table illustrating an example of a memory assignment table in accordance with the invention.

FIG. 8A is a schematic block diagram of an embodiment of a dispersed storage (DS) unit 36. The DS unit 36 includes a plurality of memories 1_1 to M_N, and a memory control module 146. The DS unit 36 may be implemented with any number of memories. The memories 1_1 to M_N may be physically repurposed to the DS unit from a legacy computing system. The memory control module 146 may be implemented utilizing a computing core 26. The memory control module 146 is operably coupled to each of the plurality of memories 1_1 to M_N. The memory control module 146 functions include one or more of controlling the memories, storing data, retrieving data, deleting data, listing data, configuring memories, allocating memories, determining status, storing metadata, storing encryption keys, storing memory device access information, and managing memories. The memory control module 146 interfaces to the network 24 to facilitate communication of control information 148 and slices 11 with a dispersed storage network (DSN).

In an example of operation, the memory control module 146 receives slices 11 via the network 24. The memory control module 146 selects one or more of the memories 1_1 to M_N to produce selected memories to store the slices 11 based on one or more of a vault identifier, a user identifier, a data identifier, a current allocation of memories to vaults, memory status, a memory age indicator, an error message, a memory performance history record, and a storage requirement. The memory control module 146 stores the slices in the selected memories.

As another example of operation, the memory control module 146 determines a memory status of a memory based on one or more of a query, a test, a performance record, an availability record, a reliability record, an error message, a memory age indicator, a usable memory life indicator, a set of usable memory life thresholds, a previous memory status, a message, a usable portion of the memory indicator, an unusable portion of the memory indicator, and a command. For instance, the memory control module 146 determines the memory status based on verifying operation via a test of one or more portions of the memory. The method of operation of the memory control module 146 is discussed in greater detail with reference to FIG. 8B-15.

FIG. 8B is a table illustrating an example of a memory assignment table 150. The memory assignment table 150 includes a memory identifier (ID) field 152, an allocation field 154, and a memory status field 156. The memory ID field 152 includes memory ID entries that list an identifier associated with a particular memory such that substantially all memories of a dispersed storage (DS) unit are listed within the memory assignment table 150 (e.g., memories 1__1 to M_N).

The allocation field 154 includes allocation entries that indicate whether a memory of an associated memory ID is unallocated for utilization or allocated for utilization to a vault of a dispersed storage network (DSN). For example, memories 1__1, 2__2, M__2, and M_N are unallocated, memory 1__2 is allocated to vault 320, memory 1_N is allocated to vault 59B, memories 2__1 and 2_N are allocated to vault 10A, and memory M__1 is allocated to vault 457. Two or more memories may be allocated to the same vault when the two or more memories are utilized to store slices of two or more pillars. Two or more memories may be allocated to the same vault when the two or more memories are utilized to store sub-slices of a slice received via the network 24.

The memory status field 156 includes memory status entries that indicate a memory status of an associated memory. For example, memory 1__1 has a level 3 memory status, memory 1__2 as a level 1 memory status, memory 1_N has a level 2 memory status, memory 2__1 has the level 1 memory status, memory 2__2 as an unusable memory status, memory 2_N has the level 2 memory status, memory M__1 as the level 1 memory status, memory M__2 as the unusable memory status, and memory M_N has the level 1 memory status.

Figure 9A:
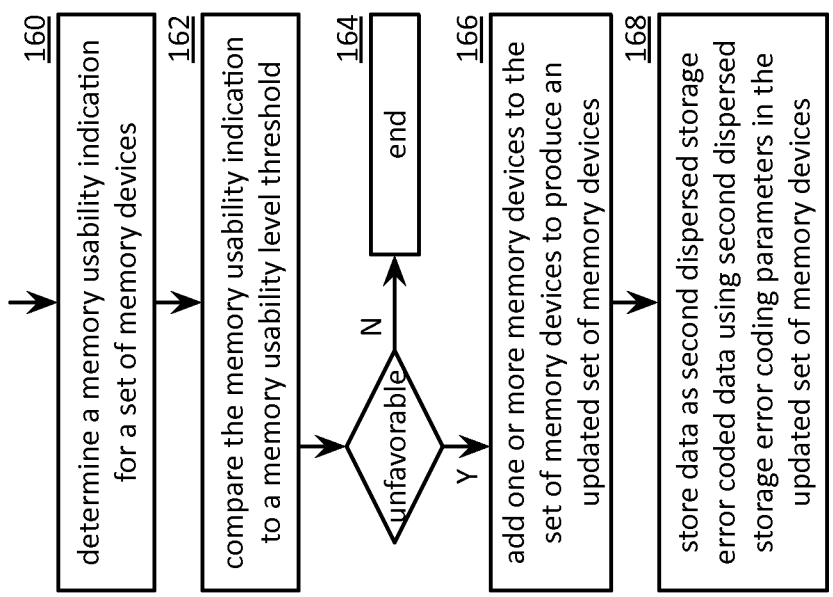
FIG. 9A is a flowchart illustrating an example of allocating memory in accordance with the invention.

FIG. 9A is a flowchart illustrating an example of allocating memory. The method begins with step 160 where a processing module (e.g., of a memory control module) determines a memory usability indication for a set of memory devices, wherein the set of memory devices stores data as first dispersed storage error coded data using first dispersed storage error coding parameters. In an embodiment, a memory device of the set of memory devices has been reprovisioned from a legacy storage protocol to an error coding dispersed storage protocol. The processing module determines the memory usability indication by at least one of querying a memory usability level table, testing the set of memory devices, determining a memory assignment, receiving an error message, retrieving an error message history, receiving a message, and receiving a command.

The method continues at step 162 where the processing module compares the memory usability indication to a memory usability level threshold. The method branches to step 166 when the comparison is unfavorable. The method continues to step 164 when the comparison is favorable. The method ends at step 164.

The method continues at step 166 where the processing module adds one or more memory devices to the set of memory devices to produce an updated set of memory devices when the memory usability indication compares unfavorably to the memory usability level threshold. For example, the processing module adds two memory devices that were not part of the set of memory devices to set a memory device to produce the updated set of memory devices. Alternatively, the processing module compares the memory usability indication to a plurality of memory usability level thresholds, wherein the plurality of memory usability level thresholds includes the memory usability level threshold, based on the comparing the memory usability indication to the plurality of memory usability level thresholds, determines a number of memory devices to add to the set of memory devices to produce a determined number of memory devices, and adds, as the one or more memory devices, the determined number of memory devices to the set of memory devices. The processing module may compare the memory usability indication to the plurality of memory usability level thresholds by one or more of comparing a usable memory life of the set of memory devices to the plurality of memory usability level thresholds, comparing storage requirements associated with the data to the plurality of memory usability level thresholds, querying a memory usability level table, testing the set of memory devices, determining a memory assignment, receiving an error message, retrieving an error message history, receiving a message, and receiving a command.

The method continues at step 168 where the processing module stores the data as second dispersed storage error coded data using second dispersed storage error coding parameters in the updated set of memory devices. Storing the data as second dispersed storage error coded data includes selecting, based on the comparing the memory usability indication to the memory usability level threshold, the second dispersed storage error coding parameters to have a decode threshold substantially equal to a decode threshold of the first dispersed storage error coding parameters and to have a larger pillar width than a pillar width of the first dispersed storage error coding parameters. For example, the processing module selects the second dispersed storage error coding parameters to include a pillar width of 18 and a decode threshold of 10 when the first dispersed storage error coding parameters includes a pillar width of 16 and a decode threshold of 10. Next, the processing module obtains the data and dispersed storage error encodes the data utilizing the second dispersed storage error coding parameters to produce the data as second dispersed storage error coded data (e.g., a plurality of sets of encoded data slices). The processing module stores encoded data slices associated with pillars 17 and 18 in memory devices added to the set of memory devices. The processing module updates a virtual dispersed storage network (DSN) address to physical location table to indicate which memory devices are storing which pillars.

Alternatively, the storing the data as second dispersed storage error coded data includes selecting, based on the comparing the memory usability indication to the memory usability level threshold, the second dispersed storage error coding parameters to have a smaller decode threshold than a decode threshold of the first dispersed storage error coding parameters and to have a pillar width that is substantially equal to or greater than a pillar width of the first dispersed storage error coding parameters. For example, the processing module selects the second dispersed storage error coding parameters to include a pillar width of 18 and a decode threshold of 8 when the first dispersed storage error coding parameters includes a pillar width of 16 and a decode threshold of 10. Next, the processing module obtains the data and dispersed storage error encodes the data utilizing the second dispersed storage error coding parameters to produce the data as second dispersed storage error coded data. The processing module stores the second dispersed storage error coded data in the updated set of memory devices. For instance, each pillar of 18 pillars is stored in a unique memory of the updated set of memory devices that includes the memory devices added to the set of memory devices.

Alternatively, the processing module compares the memory usability indication to a plurality of memory usability level thresholds, wherein the plurality of memory usability level thresholds includes the memory usability level threshold and based on the comparing the memory usability indication to the plurality of memory usability level thresholds, selects the second dispersed storage error coding parameters from a plurality of dispersed storage error coding parameters.

FIG. 9B is a flowchart illustrating another example of allocating memory, which include similar steps to FIG. 9A. The method begins with steps 160-162 of FIG. 9A where a processing module (e.g., of a memory control module) determines a memory usability indication for a set of memory devices, wherein the set of memory devices stores data as first dispersed storage error coded data using first dispersed storage error coding parameters and compares the memory usability indication to a memory usability level threshold. The method branches to step 170 when the comparison is unfavorable. The method continues to step 164 of FIG. 9A when the comparison is favorable. The method ends at step 164 of FIG. 9A.

The method continues at step 170 where the processing module determines, based on the comparison of the memory usability indication and the memory usability level threshold at least one of whether to add one or more memory devices to the set of memory devices and whether to change the first dispersed storage error coding parameters. Alternatively, the processing module makes a default determination to add one or more memory devices to the set of memory devices and to change the first dispersed storage error coding parameters. For example, processing module determines to add one or more memory devices when the comparison indicates that a significant reliability improvement is required. As another example, the processing module determines to only change the first dispersed storage error coding parameters when the comparison indicates that a modest reliability improvement is required. The method continues at step 172 where the processing module determines whether to add one or more member devices to the set of memory devices based on the determining whether to add one or more member devices to the center member devices and whether to change first dispersed storage error coding parameters.

The method branches to step 174 when the processing module determines not to change the first dispersed storage error coding parameters without adding memory. The method continues to step 166 of FIG. 9A when the processing module determines to add memory. The method continues with steps 166-168 of FIG. 9A where the processing module adds one or more memory devices to the set of memory devices to produce an updated set of memory devices when the determination is to add the one or more memory devices and the processing module stores the data as second dispersed storage error coded data using second dispersed storage error coding parameters in the updated set of memory devices.

The method continues at step 174 where the processing module selects the second dispersed storage error coding parameters based on the comparison of the memory usability indication to the memory usability level threshold. The method continues at step 176 where the processing module stores the data as the second dispersed storage error coded data using second dispersed storage error coding parameters in at least one of the set of memory devices and the updated set of memory devices.

Figure 10:
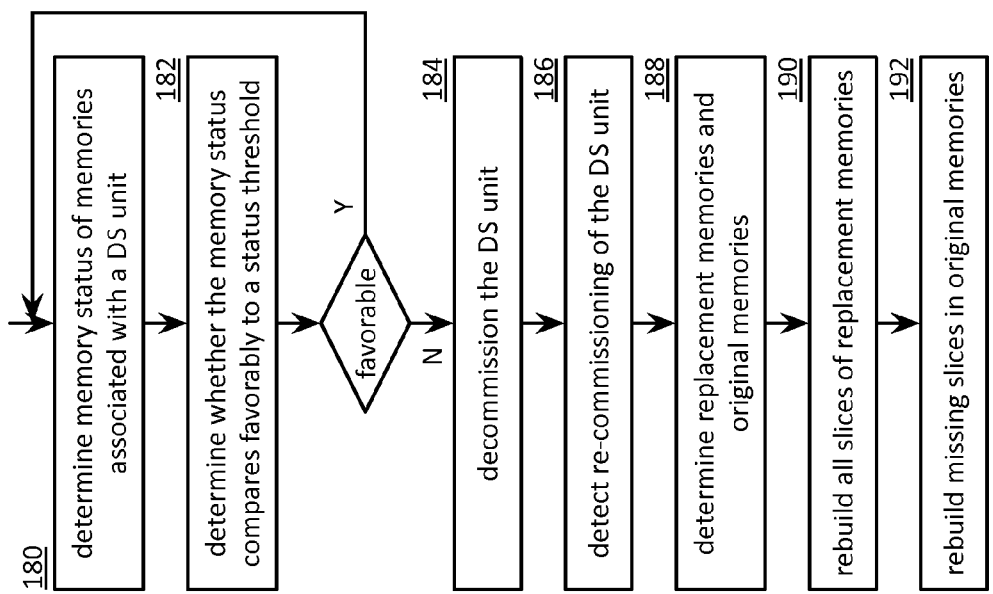
FIG. 10 is a flowchart illustrating an example of rebuilding a dispersed storage unit in accordance with the invention.

FIG. 10 is a flowchart illustrating an example of rebuilding a dispersed storage unit. The method begins with step 180 where a processing module (e.g., of a memory control module) determines a current memory status of memories associated with a dispersed storage (DS) unit. The determination may be based on one or more of a lookup in a memory assignment table, a test, a query, and retrieving a historical performance record. The method continues at step 182 where the processing module determines whether the memory status compares favorably to a status threshold. For example, the processing module determines that the memory status compares favorably to the status threshold when a number of errors of a memory is less than an error threshold of the status threshold. The method repeats back to step 180 when the processing module determines that the memory status does compare favorably to the status threshold. The method continues to step 184 when the processing module determines that the memory status does not compare favorably to the status threshold (e.g., too many errors).

The method continues at step 184 where the processing module decommissions the DS unit. The decommissioning may include one or more of shutting down the DS unit, sending an error message to a DS managing unit, and changing a status indicator for the DS unit. The method continues at step 186 where the processing module detects re-commissioning of the DS unit. The detection may be based on one or more of a message, a command, a request, an error message, and a DS unit identifier. The DS unit may have been repaired such that one or more failing memories may have been replaced with replacement memories when the DS unit is re-commissioned.

The method continues at step 188 where the processing module determines replacement memories and original memories (e.g., those not replaced). The determination may be based on one or more of a memory query, a virtual dispersed storage network (DSN) address to physical location table lookup, a list, and detecting encoded data slices. For example, the processing module determines that a memory is a replacement memory when there are no previously stored encoded data slices stored on the memory. As another example, the processing module determines that a memory is an original memory when there are pervasive stored encoded data slices stored on the memory.

The method continues at step 190 where the processing module rebuilds all slices associated with the replacement memories. Such slices are missing for those slices stored previous to the decommissioning of the DS unit in addition to the slices that may have been stored between the time that the DS unit was decommissioned and subsequently re-commissioned. For example, the processing module decodes a threshold number of retrieved slices from other memories to produce data, dispersed error encodes the data to produce encoded data slices corresponding to the pillars of the replacement memories, and stores the encoded data slices in the corresponding replacement memories of the DS unit.

The method continues at step 192 where the processing module rebuilds all slices associated with the original memories. Such slices are missing for those slices stored between the time that the DS unit was decommissioned and subsequently re-commissioned. For example, the processing module decodes a threshold number of retrieved slices from other memories to produce data, dispersed error encodes the data to produce encoded data slices corresponding to the pillars of the original memories, and stores the encoded data slices in the corresponding original memories of the DS unit. In addition, the processing module may delete slices that were deleted between the time that the DS unit was decommissioned and the time when the DS unit was re-commissioned.

Figure 11B:
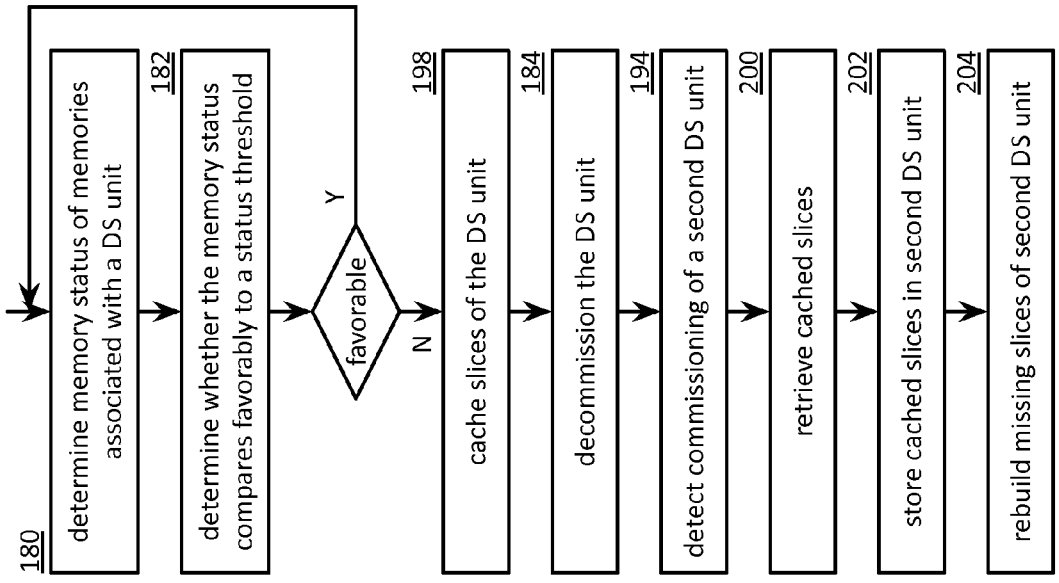
FIG. 11B is another flowchart illustrating another example of commissioning a dispersed storage unit in accordance with the invention.
Figure 11A:
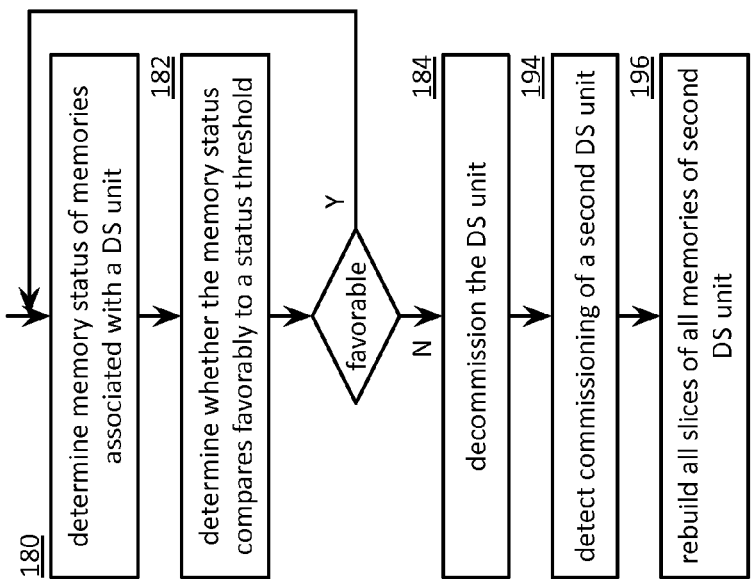
FIG. 11A is a flowchart illustrating an example of commissioning a dispersed storage unit in accordance with the invention.

FIG. 11A is a flowchart illustrating an example of commissioning a dispersed storage unit, which includes similar steps to FIG. 10. The method begins with steps 180-182 of FIG. 10 where a processing module (e.g., of a memory control module) determines a current memory status of memories associated with a dispersed storage (DS) unit and whether the memory status compares favorably to a status threshold. The method repeats back to step 180 of FIG. 10 when the processing module determines that the memory status does compare favorably to the status threshold. The method continues to step 184 of FIG. 10 when the processing module determines that the memory status does not compare favorably to the status threshold (e.g., too many errors). The method continues at step 184 of FIG. 10 where the processing module decommissions the DS unit.

The method continues at step 194 where the processing module detects commissioning of a second DS unit. The detection may be based on one or more of a message, a command, a request, an error message, and a DS unit identifier. The DS unit may have been permanently retired and replaced with the second DS unit.

The method continues with step 196 where the processing module rebuilds all slices of all memories associated with the second DS unit. Such slices are missing for those slices stored previous to the decommissioning of the DS unit in addition to the slices that may have been stored (e.g., to memories of other pillars) between the time that the DS unit was decommissioned and the second DS unit was commissioned. For example, the processing module decodes a threshold number of retrieved slices from other memories to produce data, dispersed error encodes the data to produce encoded data slices corresponding to the pillars of the replacement memories, and stores the encoded data slices in the corresponding memories of the second DS unit.

FIG. 11B is another flowchart illustrating another example of commissioning a dispersed storage unit, which includes similar steps to FIGS. 10 and 11A. The method begins with steps 180-182 of FIG. 10 where a processing module (e.g., of a memory control module) determines a current memory status of memories associated with a dispersed storage (DS) unit and determines whether the memory status compares favorably to a status threshold. The method repeats back to step 180 of FIG. 10 when the processing module determines that the memory status does compare favorably to the status threshold. The method continues to step 198 when the processing module determines that the memory status does not compare favorably to the status threshold (e.g., too many errors).

The method continues at step 198 where the processing module caches slices of the DS unit (e.g., into other DS units). The method continues with step 184 of FIG. 10 where the processing module decommissions the DS unit. The method continues with step 194 of FIG. 11A where the processing module detects commissioning of a second DS unit. The DS unit may have been permanently retired and replaced with the second DS unit.

The method continues at step 200 where the processing module retrieves the cached slices. Pour example, the processing module sends a retrieve slice command to one or more memories of one or more other DS units and receives the cached slices in response. The method continues at step 202 where the processing module stores the cached slices in the second DS unit. The method continues at step 204 where the processing module rebuilds missing slices of the second DS unit. Such slices are missing for those slices stored between the time that the DS unit was decommissioned and the second DS unit was commissioned. For example, the processing module decodes a decodes threshold number of retrieved slices from other memories to produce data, dispersed error encodes the data to produce encoded data slices corresponding to the pillars of the replacement memories, and stores the encoded data slices in the corresponding memories of the second DS unit.

FIG. 12A is a table illustrating an example of a data location table 206 that includes a data identifier (ID) field 208, a legacy memory address field 210, and a dispersed storage network (DSN) address field 212. The data location table 206 may be utilized to identify storage locations of data wherein the data may be stored in one or more of a legacy memory and a dispersed storage network. The data ID field 208 includes one or more data ID entries, wherein each data ID entry includes at least one of an object identifier, a filename, a source name, a slice name, and any other identifier of a data file. For example, data 122 represents a word processing data file. The legacy memory address field 210 includes one or more legacy memory address entries corresponding to one or more data IDs, wherein the legacy memory address includes a memory identifier of a memory of a legacy computing system (e.g., not a dispersed storage network). For example, legacy memory address 104 is utilized to store data identified by data 122.

The DSN address field 212 includes one or more DSN address entries corresponding to one or more data IDs, wherein the DSN address includes at least one of a source name and a slice name. For example, the data identified by data 122 is stored in the DSN system at DSN address 1AC. Data may be stored in one or both of the legacy memory and the DSN system. For example, data 132 is stored in legacy memory 110 but is not stored in the DSN system. As another example, data 134 is not stored in the legacy memory but is stored in the DSN system at DSN address 2D5. As yet another example, data 122 is stored in legacy memory 104 and in the DSN system at DSN address 1AC. The method of utilization of the data location table is discussed in greater detail with reference to FIG. 12B.

FIG. 12B is a flowchart illustrating an example of retrieving data. The method begins with step 214 where a processing module (e.g., of a dispersed storage (DS) unit) receives a retrieval request for a file. The request may include one or more of a data identifier (ID), a legacy memory address, a dispersed storage network (DSN) address, a data location table, a migration indicator, and a requesting entity ID.

The method continues at step 216 where the processing module determines whether the file is being migrated from a legacy storage system to a dispersed error coding storage system. The determination may be based on determining whether that the file is stored in a legacy format in the legacy storage system and is stored as a plurality of sets of encoded data slices in the dispersed error coding storage system. For example, the processing module accesses a data location table and determines that the file is being migrated when the file is stored in the legacy format and is stored as the plurality of sets of encoded data slices. As another example, the processing module determines that the file is being migrated when the migration indicator indicates that the file is being migrated. The method branches to step 221 the processing module determines that the file is being migrated. The method continues to step to step 218 when the processing module determines that the file is not being migrated. The method continues at step 218 where the processing module obtains the file. The obtaining includes one or more of performing the data location table lookup to determine a location corresponding to the file, accessing the file from the legacy storage system, and accessing the file from the dispersed error coding storage system.

The method continues at step 220 where the processing module determines a retrieval option for the file when the file is being migrated from the legacy storage system to the dispersed error coding storage system. The retrieval option includes at least one of retrieve the legacy format from the legacy storage system only, retrieve the plurality of sets of encoded data slices from the dispersed error coding storage system only, and retrieve both the legacy format from the legacy storage system and the plurality of sets of encoded data slices from the dispersed error coding storage system and outputting, based on first available, the legacy format or the plurality of sets of encoded data slices. The processing module determines the retrieval option for the file based on at least one of a retrieval latency requirement, a retrieval reliability requirement, a memory availability requirement, and a maximum bandwidth utilization requirement. For example, the processing module determines the retrieval option to include retrieving the legacy format when the retrieval latency requirement indicates a low latency is required. As another example, the processing module determines the retrieval option to include retrieving the plurality of sets of encoded data slices when the retrieval reliability requirement indicates high reliability is required.

The method continues at step 222 where the processing module retrieves the file, based on the retrieval option, in at least one of a legacy format from the legacy storage system and a plurality of sets of encoded data slices from the dispersed error coding storage system. The processing module decodes the plurality of sets of encoded data slices to produce reconstructed data when retrieving the plurality of sets of encoded data slices and outputs the reconstructed data in accordance with the retrieval option. Alternatively, or in addition to, the processing module decodes the plurality of sets of encoded data slices to produce reconstructed data, compares the reconstructed data with the legacy format of the file, and overwrites the legacy format of the file with the reconstructed data when the legacy format of the file does not substantially match the reconstructed data. Alternatively, or in addition to, the processing module decodes the plurality of sets of encoded data slices to produce reconstructed data, compares the reconstructed data with the legacy format of the file, deletes the legacy format of the file when the legacy format of the file substantially matches the reconstructed data, and updates a data location table to indicate that the file is not stored in the legacy storage system.

Figure 13:
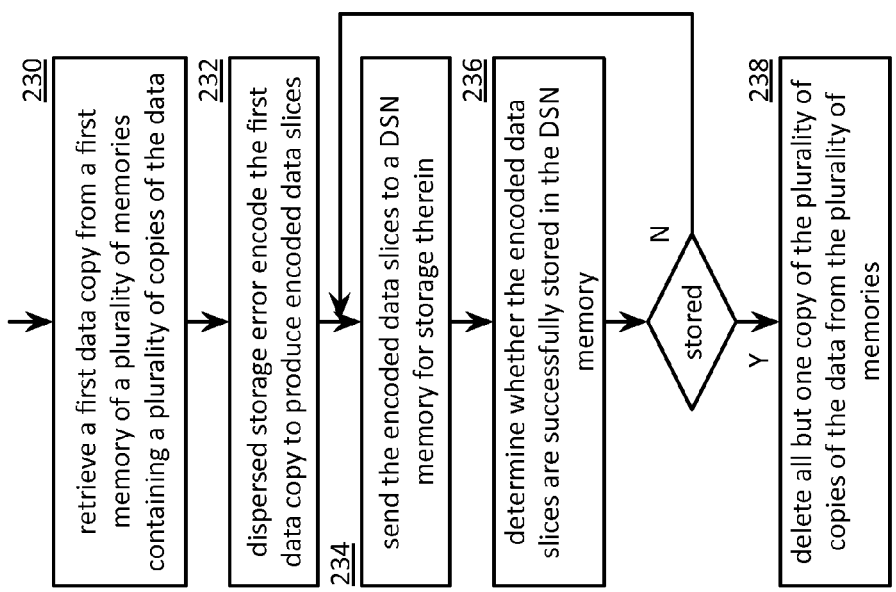
FIG. 13 is a flowchart illustrating an example of migrating data in accordance with the invention.

FIG. 13 is a flowchart illustrating an example of migrating data. The method begins with step 230 where a processing module (e.g., of a dispersed storage (DS)unit) retrieves a first data copy from a first memory of a plurality of memories containing a plurality of copies of the data. For example, data is replicated using a redundant array of independent disks (RAID) approach such that a plurality of redundant copies of the data are stored in the plurality of memories. The method continues at step 232 where the processing module dispersed storage error encodes the first data copy to produce encoded data slices. The method continues at step 234 where the processing module sends the encoded data slices to a dispersed storage network (DSN) memory for storage therein.

The method continues at step 236 where the processing module determines whether the encoded data slices are successfully stored in the DSN memory. The determination may be based on one or more of a query, receiving a storage confirmation message, receiving an error message, and receiving a command. For example, the processing module determines that the encoded data slices are successfully stored when the processing module receives a slice storage confirmation message from a write threshold number of DS units of the DSN memory. The method repeats back to step 230 when the processing module determines that the encoded data slices are not successfully stored in the DSN memory. The method continues to step 238 when the processing module determines that the encoded data slices are stored successfully in the DSN memory.

The method continues at step 238 where the processing module deletes all but one copy of the plurality of copies of the data from the plurality of memories. For example, the processing module deletes the redundant copies of the data from the RAID system leaving just one copy in the RAID system in addition to the copy stored as encoded data slices in the DSN memory. In addition, the processing module may send a message to a RAID controller indicating that storing further redundant copies of the data is not required (e.g., since the data is now backed up in the DSN memory).

FIG. 14 is a flowchart illustrating another example of migrating data. The method begins with step 240 where a processing module (e.g., of a memory control module) determines error characteristics of a memory. The error characteristics include one or more of real-time stored errors, historical storage errors, retrieval errors, latency performance outside of a specification, and a performance factor out of specification. The determination of the error characteristics may be based on one or more of receiving an error characteristic history, a message, a lookup, and a command. The method continues at step 242 where the processing module determines whether the error characteristics compare favorably to a threshold. The method repeats back to step 240 when the processing module determines that the error characteristics compare favorably to a threshold. The method continues to step 244 when the processing module determines that the error characteristics does not compare favorably to the threshold (e.g., too many errors).

The method continues at step 244 where the processing module assigns a portion of a responsible dispersed storage network (DSN) address range of the memory to at least one other memory. For example, the processing module assigns 10% of the DSN address range of the memory to a second memory by choosing the second memory (e.g., with available capacity) and modifying a DSN address to physical location table to indicate that the 10% of the DSN address range is now assigned to the second memory and not to the memory.

The method continues at step 246 where the processing module migrates encoded data slices corresponding to the portion of the responsible DSN address range to the at least one other memory. For example, the processing module retrieves encoded data slices from the memory corresponding to at least a portion of the 10% of the DSN address range and sends the encoded data slices to the second memory for storage therein.

The method continues at step 248 where the processing module determines whether all of the responsible DSN address range of the memory has been reassigned and slices migrated. The determination may be based on examination of the virtual DSN address to physical location table, wherein the table indicates whether slice names are no longer allocated to the memory. The method repeats back to step 244 when the processing module determines that all of the responsible DSN address range of the memory has not been reassigned. For example, the method repeats back when the processing module determines that only 30% of the responsible DSN address range of the memory has been reassigned. The method continues to step 250 when the processing module determines that all the responsible DSN address range of the memory has been reassigned. For example, the processing module determines that all of the responsible DSN address range of the memory has been reassigned when 100% of the responsible DSN address range of the memory has been reassigned.

The method continues at step 250 where the processing module decommissions the memory. In addition, the decommission memory may be subsequently replaced by new memory. In addition, the processing module may retrieve migrated encoded data slices from the at least one other memory and store the encoded data slices in the new memory.

FIG. 15 is a flowchart illustrating an example of repurposing a memory. The method begins with step 252 where a processing module (e.g., of a memory control module) determines a memory for repurposing. The determination may be based on one or more of detection of a new memory being added to a dispersed storage (DS) unit, detection of a legacy memory now installed in a DS unit and detection of a memory that is identified for disposal. Repurpose them scenarios include one or more of moving a memory from a legacy system to a dispersed storage network (DSN) system, moving a memory from a DS unit to another DS unit, disposing of a memory from a legacy system, and disposing of a memory from a DSN system.

The method continues at step 254 where the processing module determines repurposing requirements. The determination may be based on one or more of a message, a scenario type (e.g., disposal or moving), a security requirement, a data type, a lookup, a predetermination, a message, and a command. Repurposing requirements may include one or more of a required number of write cycles indicator, whether to analyze the memory after one or more write cycles, what type of repurposing data to write to the memory, and a maximum amount of time to utilize when repurposing the memory.

The method continues at step 256 where the processing module determines error coding dispersal storage function parameters. The determination may be based on one or more of the memory selected for repurposing, a memory type indicator, a data type indicator, a security requirement, the repurposing requirements, a repurposing scenario indicator, a lookup, a predetermination, a message, and a command. For example, the processing module determines a pillar width to be 32 when the security requirement indicates high security. As another example, the processing module determines the pillar width to be 6 when the security requirement indicates low security.

The method continues with step 258 where the processing module determines repurposing data. The repurposing data includes data to be stored as encoded data slices in the memory. The determination may be based on one or more of the error coding dispersal storage function parameters, the repurposing requirements, a message, a repurposing scenario indicator, a memory type indicator, a data type indicator, a security requirement, a lookup, a predetermination, a message, and a command. For example, the processing module determines repurposing data to include a random pattern of zeros and ones when the scenario type indicates that the memory is being moved from a legacy system to a DSN system. As another example, the processing module determines repurposing data to include all zeroes when the scenario type indicates that the memory is being disposed.

The method continues at step 260 where the processing module dispersed error encodes the repurposing data utilizing the error coding dispersal storage function parameters to produce encoded repurposing data slices. The method continues at step 262 where the processing module sends the encoded repurposing data slices to the memory for storage therein. The method continues with at step 264 where the processing module determines whether repurposing is complete. The determination may be based on one or more of the error coding dispersal storage function parameters, the repurposing data, a required number of write cycles indicator, a number of actual write cycles indicator, a query, a test, a read result, the repurposing requirements, a message, a repurposing scenario indicator, a memory type indicator, a data type indicator, a security requirement, a lookup, a predetermination, a message, and a command. For example, the processing module determines that the repurposing is not complete when the number of actual write cycles indicator is less than the required number of write cycles indicator. The method repeats back to step 262 when the processing module determines that the repurposing is not complete. In such repeating, the processing module may write the same data to the memory or write more data as specified by the repurposing data. The processing module may write the repurposing data once, 10 times, 100 times, or even more than 1,000 times to the memory. Note that an improvement to data security may be provided when writing data over old data of the memory multiple times.

The method continues to step 266 when the processing module determines that the repurposing is complete. The method continues at step 266 where the processing module indicates that the repurposing is complete (e.g., by sending a message). In addition, the processing module may allocate the memory for utilization within the DSN system when not disposing of the memory. The processing module deactivates the memory prior to disposing of the memory.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a storage unit of a distributed storage network (DSN), the method comprises:
   tracking age related failure levels of a plurality of memory devices within the storage unit in a memory assignment table;
   maintaining a data location table that maps a range of DSN addresses allocated to the storage unit to the plurality of memory devices and further records storing of encoded data slices having specific DSN addresses within corresponding ones of the plurality of memory devices;
   when the age related failure level for a memory device of the plurality of memory devices compares unfavorably to a first failure level threshold:

determining to reassign a portion of DSN addresses assigned to the memory device;
identifying a second memory device of the plurality of memory devices having a corresponding age related soft failure level comparing favorable to the first failure level threshold;
reassigning the portion of the DSN addresses from the memory device to the second memory device; and
updating the data location table in accordance with the reassigning the portion of the DSN addresses.

2. The method of claim 1 further comprises:
updating the memory assignment table by adjusting an age related failure field for the memory device to reflect the unfavorable comparison of the age related failure level to the first failure level threshold, wherein the memory assignment table includes a plurality of entries, and wherein an entry of the plurality of entries includes a memory identifier field, an allocation status field, and an age related failure level field.

3. The method of claim 1 further comprises:
identifying encoded data slices having DSN addresses in the portion of the DSN addresses; and
transferring storage of the encoded data slices having the DSN addresses in the portion of the DSN addresses from the memory device to the second memory device.

4. The method of claim 1 further comprises:
identifying encoded data slices having DSN addresses in the portion of the DSN addresses; and
determining whether an encoded data slice of the encoded data slices having the DSN address in the portion of the DSN addresses requires rebuilding; and
when the encoded data slice of the encoded data slices having the DSN address in the portion of the DSN addresses requires rebuilding, flagging the encoded data slice for rebuilding.

5. The method of claim 1, wherein the tracking the age related failure levels comprises:
for each of the plurality of memory devices, determining error characteristics, wherein the error characteristics include one or more of real-time stored errors, historical storage errors, retrieval errors, latency performance outside of a specification, and a performance factor out of specification.

6. The method of claim 1 further comprises:
when the age related failure level for the memory device compares unfavorably to a second failure level threshold:
determining whether to decommission and replace the memory device, decommission the memory device and utilize a third memory device, reassigning a second portion of the DSN addresses from the memory device to the second memory device;
when the determination is to decommission and replace the memory device:
decommissioning the memory device; and
when a replacement memory device is commissioned, storing encoded data slices that were stored on the memory device on the replacement memory device.

7. The method of claim 6, wherein the storing the encoded data slices on the replacement memory device further comprises one of:
caching the encoding data slices and, when the replacement memory device is commissioned, copying the cached encoded data slices onto the replacement memory device; and
flagging the encoded data slices for rebuilding and, when the replacement memory device is commissioned, storing rebuilt encoded data slices in the replacement memory device.

8. The method of claim 6 further comprises:
when the determination is to decommission and utilize the third memory device:
decommissioning the memory device; and
storing encoded data slices that were stored on the memory device on the third memory device.

9. The method of claim 6 further comprises:
when the determination is to reassign the second portion of the DSN addresses from the memory device to the second memory device:
reassigning the second portion of the DSN addresses from the memory device to the second memory device; and
updating the data location table in accordance with the reassigning the second portion of the DSN addresses.

10. The method of claim 1 further comprises:
analyzing commutative age related failure levels of the plurality of memories; and
when the cumulative age related failure levels compare unfavorably to a cumulative failure threshold level, facilitating decommissioning of the storage unit in light of cumulative age related failure levels of other storage units of the DSN, wherein the storage unit and other storage units store encoded data slices of commonly encoded data segments.

11. A computer readable storage device comprises:
a first memory for storing operational instructions that, when executed by a computing device, causes the computing device to:
track age related failure levels of a plurality of memory devices within the storage unit in a memory assignment table; and
maintain a data location table that maps a range of DSN addresses allocated to the storage unit to the plurality of memory devices and further records storing of encoded data slices having specific DSN addresses within corresponding ones of the plurality of memory devices;
a second memory for storing operational instructions that, when executed by at least one of the computing device and a second computing device, causes the at least one of the computing device and the second computing device to:
when the age related failure level for a memory device of the plurality of memory devices compares unfavorably to a first failure level threshold:
determine to reassign a portion of DSN addresses assigned to the memory device;
identify a second memory device of the plurality of memory devices having a corresponding age related soft failure level comparing favorable to the first failure level threshold;
reassign the portion of the DSN addresses from the memory device to the second memory device; and
update the data location table in accordance with the reassigning the portion of the DSN addresses.

12. The computer readable storage device of claim 11, wherein the first memory further stores operational instructions that, when executed by the computing device, causes the computing device to:
update the memory assignment table by adjusting an age related failure field for the memory device to reflect the unfavorable comparison of the age related failure level to the first failure level threshold, wherein the memory assignment table includes a plurality of entries, and wherein an entry of the plurality of entries includes a memory identifier field, an allocation status field, and an age related failure level field.

13. The computer readable storage device of claim 11, wherein the first memory further stores operational instructions that, when executed by the computing device, causes the computing device to:
identifying encoded data slices having DSN addresses in the portion of the DSN addresses; and
transferring storage of the encoded data slices having the DSN addresses in the portion of the DSN addresses from the memory device to the second memory device.

14. The computer readable storage device of claim 11, wherein the first memory further stores operational instructions that, when executed by the computing device, causes the computing device to:
identifying encoded data slices having DSN addresses in the portion of the DSN addresses; and
determining whether an encoded data slice of the encoded data slices having the DSN address in the portion of the DSN addresses requires rebuilding; and
when the encoded data slice of the encoded data slices having the DSN address in the portion of the DSN addresses requires rebuilding, flagging the encoded data slice for rebuilding.

15. The computer readable storage device of claim 11, wherein the first memory further stores operational instructions that, when executed by the computing device, causes the computing device to track the age related failure levels by:
for each of the plurality of memory devices, determining error characteristics, wherein the error characteristics include one or more of real-time stored errors, historical storage errors, retrieval errors, latency performance outside of a specification, and a performance factor out of specification.

16. The computer readable storage device of claim 11, wherein the second memory further stores operational instructions that, when executed by the at least one of the computing device and the second computing device, causes the at least one of the computing device and the second computing device to:
when the age related failure level for the memory device compares unfavorably to a second failure level threshold:
determine whether to decommission and replace the memory device, decommission the memory device and utilize a third memory device, reassigning a second portion of the DSN addresses from the memory device to the second memory device;
when the determination is to decommission and replace the memory device:
decommission the memory device; and
when a replacement memory device is commissioned, store encoded data slices that were stored on the memory device on the replacement memory device.

17. The computer readable storage device of claim 16, wherein the second memory further stores operational instructions that, when executed by the at least one of the computing device and the second computing device, causes the at least one of the computing device and the second computing device to store the encoded data slices on the replacement memory device by one of:
caching the encoding data slices and, when the replacement memory device is commissioned, copying the cached encoded data slices onto the replacement memory device; and
flagging the encoded data slices for rebuilding and, when the replacement memory device is commissioned, storing rebuilt encoded data slices in the replacement memory device.

18. The computer readable storage device of claim 16, wherein the second memory further stores operational instructions that, when executed by the at least one of the computing device and the second computing device, causes the at least one of the computing device and the second computing device to:
when the determination is to decommission and utilize the third memory device:
decommission the memory device; and
store encoded data slices that were stored on the memory device on the third memory device.

19. The computer readable storage device of claim 16, wherein the second memory further stores operational instructions that, when executed by the at least one of the computing device and the second computing device, causes the at least one of the computing device and the second computing device to:
when the determination is to reassign the second portion of the DSN addresses from the memory device to the second memory device:
reassign the second portion of the DSN addresses from the memory device to the second memory device; and
update the data location table in accordance with the reassigning the second portion of the DSN addresses.

20. The computer readable storage device of claim 11, wherein the second memory further stores operational instructions that, when executed by the at least one of the computing device and the second computing device, causes the at least one of the computing device and the second computing device to:
analyze commutative age related failure levels of the plurality of memories; and
when the cumulative age related failure levels compare unfavorably to a cumulative failure threshold level, facilitate decommissioning of the storage unit in light of cumulative age related failure levels of other storage units of the DSN, wherein the storage unit and other storage units store encoded data slices of commonly encoded data segments.

* * * * *